March 24, 1936.　　J. B. GRAHAM　　2,034,808
DRILL TUBE JOINT
Filed Oct. 5, 1933
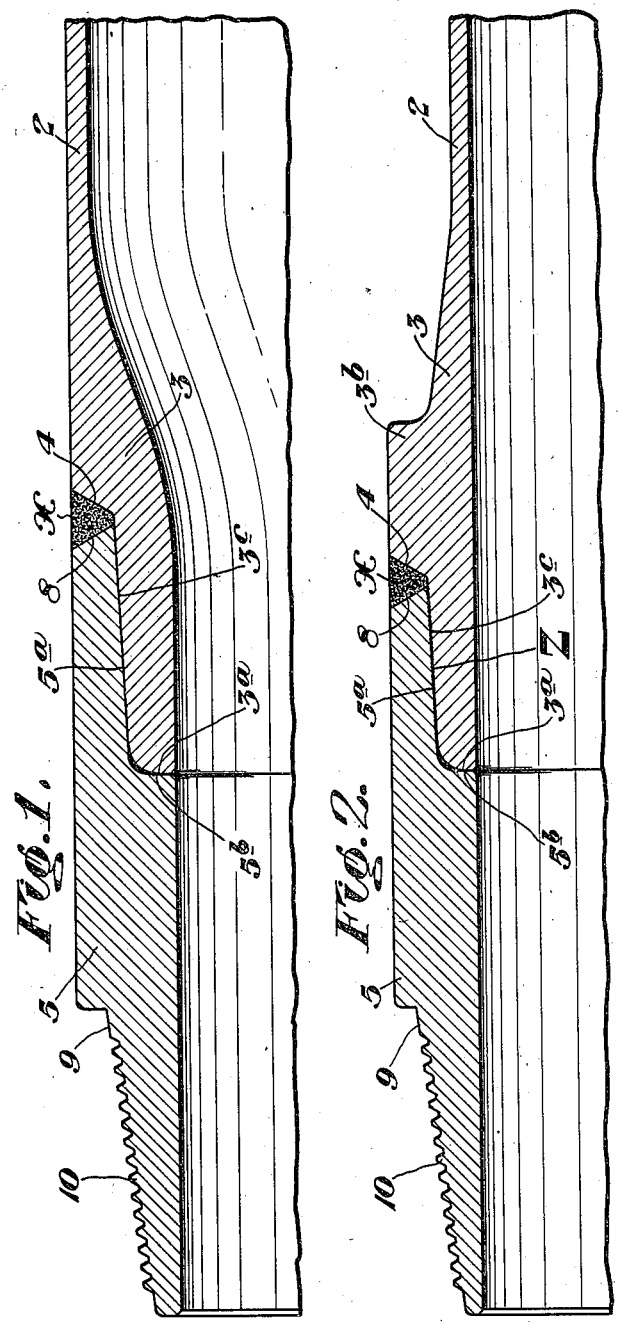
Inventor:
JAMES B. GRAHAM,
by: Usina & Rauber
his Attorneys.

Patented Mar. 24, 1936

2,034,808

UNITED STATES PATENT OFFICE 2,034,808

DRILL TUBE JOINT

James B. Graham, Mount Lebanon, Pa.

Application October 5, 1933, Serial No. 692,344

2 Claims. (Cl. 285—111)

This invention relates to drill tube joints used in the drilling of wells, and formed of a series of detachably connected sections, carrying a drilling tool at the lowermost end thereof.

As is well known to those skilled in the art, drill tubes are rotated in practice and subjected to very great torsional strains. In the past, numerous attempts have been made to form integral coupling members on the ends of drill tube sections, but difficulty has arisen owing to the thinness of the walls of the tubes that are used for this type of work. Obviously, this difficulty could not be overcome by solely utilizing tubes having unusually thick walls, because the drills are very long and the extra weight would make their use prohibitive. Such tubes would also be a great deal more expensive to manufacture and require much greater power to operate.

In some instances, the ends of the tubes are screw-threaded and connected together by means of a sleeve having cooperating screw-threads.

The sleeve may be manufactured of considerably harder material than the drill tube, but the threads on the tube cannot be so serviceable because constant assembling and disassembling operations tend to wear them in such manner as to make them entirely unfit for use. This difficulty, of course, is not so great in the drill tube joints, due to their considerably higher tensile properties.

In numerous devices of the prior art, the ends of the tubes must have a very substantial "upset" in order to procure tensile properties commensurate with those of the drill tube joints. Large and extended upset portions are, of course, both difficult and expensive to procure.

In accordance with the teachings of the present invention, drill tube sections are provided with a minimum upset portion, and yet cooperate with the drill tube joint in such manner as to provide a very light and integral construction having none of the usual inherent weaknesses.

One object of the present invention is to provide a novel drill tube section and joint which is exceedingly cheap and easy to manufacture and one that will be very durable in service.

Another object is to provide a drill tube section having a very small upset area and adapted to be integrally formed to a drill tube joint of very high tensile properties, the latter having a threaded tool joint extremity providing exceedingly durable characteristics and one which may be easily galvanized, or "electroplated".

Another object is to provide a novel drill tube joint which is interfitted and welded to the modified drill tube section, the union of the two elements being such that slight weaknesses in the weld will not affect the operation of the unit.

These and further objects will be apparent after referring to the drawing, in which:

Figure 1 is a detail sectional elevation of the device of the invention.

Figure 2 is a view similar to Figure 1 but disclosing a modification thereof.

In Figure 1 of the drawing the numeral 2 designates a drill tube section which is upset as at 3 and provided with an end area $3^c$ of reduced and tapered diameter. An outward flare 4 adjoins the end of the reduced and tapered area $3^c$. A drill tube joint 5 is provided with a taper $5^a$ on its inner wall which is adapted to telescope over the reduced and tapered end area $3^c$ of the drill tube. The inner wall of the drill tube joint provides an annular seat $5^b$ for the end $3^a$ of the drill tube, and its end is flared, as at 8. The other extremity of the drill tube joint is tapered as at 9 and provided with screw-threads 10 for a substantial portion of its surface.

In assembling the device of Figure 1 the tapered wall $5^a$ of the drill tube joint is "shrunk" or "press-fitted" on the reduced and tapered end $3^c$ of the drill tube section 2. In this position the flares 4 and 8 of the drill tube section and drill tube joint, respectively, are relatively adjacent and a wedge-shaped concentric weld is employed for firmly uniting the elements.

Referring to Figure 2 of the drawing a modified form of the device of the invention is illustrated.

This modified construction is quite similar to that of Figure 1, except that in the former the end of the outer wall of the drill tube 2 is provided with an upset 3 which protrudes beyond its outer wall, as at $3^b$, while in the latter the outside diameters of drill tube and joint are flush throughout their lengths.

It is to be noted, in Figure 2, that the contacting surfaces $3^c$ and $5^a$ of the telescoping connection are shown at Z as being knurled which provides even greater assurance against relative movement whether the elements are "shrunk" or "press-fitted". This modification may, of course, be used in all of the other embodiments with equal success.

In all embodiments of the invention flush surfaces of the drill tube and drill tube joint may be provided by displacing the metal of the upset end of the tubes on the opposite side of the wall. In each form, the various drill tube joints are preferably, although not necessarily, composed of material which is considerably harder and possessed of much higher tensile properties than the material of the various tubes, which permits a very efficient threading and electroplating of the outer extremity of the joint. The durability of the connections, caused by the shrinking of one of the elements over the other in telescoped relationship, and the subsequent welding of the flares 4 and 8, as at X, is considerably greater than that of the wall of the drill tube.

While I have shown and described several specific embodiments of my invention, it will be understood that I do not wish to be limited exactly thereto, since various modifications may be made without departing from the scope of my invention, as defined in the following claims.

I claim:

1. An improved drill tube section comprising a hollow metal tube having an upset portion adjacent one of its ends, a tool joint composed of material which is harder than said hollow metal tube, said tool joint having a relatively thick intermedate portion whose outside diameter is substantially equal to that of the upset portion of said hollow metal tube, one of the ends of said tool joint being constructed to telescope over the end of said hollow metal tube adjacent its upset portion, the other of the ends of said tool joint being tapered and threaded, said tool joint having an internal annular shoulder spaced from its telescoping end and against which the telescoping end of said hollow metal tube is adapted to seat, and means for rigidly maintaining said tool joint and said hollow metal tube in assembled relationship.

2. An improved drill tube section comprising a hollow metal tube having an upset portion adjacent one of its ends, and a tool joint composed of material which is harder than said hollow metal tube, said tool joint having a relatively thick intermediate portion whose outside diameter is substantially equal to that of the upset portion of said hollow metal tube, one of the ends of said tool joint being constructed to telescope over the end of said hollow metal tube adjacent its upset portion, the other of the ends of said tool joint being tapered and threaded, said tool joint having an internal annular shoulder spaced from its telescoping end and adjacent which the telescoping end of said hollow metal tube is adapted to seat, said hollow metal tube having an external continuous flared shoulder, the tapered end of said tool joint having an externally flared end, the flared portions of said hollow metal tube and said tube joint being welded.

JAMES B. GRAHAM.